United States Patent [19]

Beall et al.

[11] Patent Number: 5,476,821
[45] Date of Patent: Dec. 19, 1995

[54] HIGH MODULUS GLASS-CERAMICS CONTAINING FINE GRAINED SPINEL-TYPE CRYSTALS

[75] Inventors: George H. Beall, Big Flats; Linda R. Pinckney, Corning, both of N.Y.

[73] Assignee: Corning Incorporated, Corning, N.Y.

[21] Appl. No.: 332,703

[22] Filed: Nov. 1, 1994

[51] Int. Cl.$^6$ .................................................. C03C 10/02
[52] U.S. Cl. ................. 501/10; 501/69; 501/73; 428/426; 428/694 ST
[58] Field of Search ................. 501/10, 69, 73; 428/325, 426, 471, 694 ST, 694

[56] References Cited

U.S. PATENT DOCUMENTS

| | | |
|---|---|---|
| 3,268,315 | 8/1966 | Stookey . |
| 3,585,054 | 6/1971 | Karstetter . |
| 3,681,102 | 8/1972 | Beall . |
| 3,873,329 | 3/1975 | Beall . |
| 3,936,287 | 2/1976 | Beall et al. . |
| 3,962,514 | 6/1976 | Rittler . |
| 4,059,454 | 11/1977 | Reade . |
| 4,526,873 | 7/1985 | Beall et al. . |
| 4,540,671 | 9/1985 | Kondo et al. . |
| 4,687,750 | 8/1987 | Pinckney . |
| 4,747,876 | 5/1988 | Hakamatsuka et al. . |
| 4,794,048 | 12/1988 | Oboodi et al. . |
| 4,851,372 | 7/1989 | Lindig et al. . |
| 4,985,375 | 1/1991 | Tanaka et al. ............... 501/10 X |
| 5,001,086 | 3/1991 | Carrier et al. . |
| 5,028,567 | 7/1991 | Gotoh et al. . |
| 5,061,307 | 10/1991 | Matano et al. . |
| 5,064,460 | 11/1991 | Aitken . |
| 5,079,194 | 1/1992 | Jean et al. . |
| 5,093,173 | 3/1992 | Nakagawa et al. ................ 428/64 |

FOREIGN PATENT DOCUMENTS

| | | | |
|---|---|---|---|
| 0445877A1 | 11/1991 | European Pat. Off. | .......... C03C 8/04 |
| 1544779 | 4/1979 | United Kingdom | ............ C03B 32/00 |

*Primary Examiner*—Karl Group
*Attorney, Agent, or Firm*—Angela N. Nwaneri; Timothy M. Schaeberle

[57] ABSTRACT

This invention is directed at glass-ceramic articles, and methods for producing such articles, exhibiting Young's modulus between about 14 to $24 \times 10^6$ psi and a fracture toughness in excess of 1.0 MPa√in. The crystal phase assemblage is comprised predominately of generally uniformly-sized spinel-type crystals which are uniformly dispersed within a highly siliceous residual glass matrix phase. The composition of these glass-ceramic articles is consists essentially, expressed in terms of weight percent on the oxide basis, of 35–60% $SiO_2$, 20–35% $Al_2O_3$, 0–25% MgO, 0–25% ZnO, at least about 10% MgO+ZnO, 0–20% $TiO_2$, 0–10% $ZrO_2$, 0–2% $Li_2O$ and 0–8% NiO. However, if the $Al_2O_3$ constituent is present in an amount less than about 25%, the $TiO_2+ZrO_2+NiO$ amount should be at least 5%. The composition may also contain up to 5% of optional constituents selected from the group consisting of BaO, CaO, PbO, SrO, $P_2O_5$, $B_2O_3$, $Ga_2O_3$, 0–5% $R_2O$ and 0–8% of a transition metal oxide; the $R_2O$ selected from the group consisting of $Na_2O$, $K_2O$, $Rb_2O$ and $C_2O$.

29 Claims, 3 Drawing Sheets

HIGH MODULUS GLASS-CERAMICS CONTAINING FINE GRAINED SPINEL-TYPE CRYSTALS

FIELD OF THE INVENTION

This invention relates to a low alkali glass-ceramic exhibiting a high elastic modulus and having a crystal phase assemblage comprised predominately of uniformly-sized and uniformly distributed ultra-fine grained spinel-type crystals, and a method for producing the glass-ceramic article.

BACKGROUND OF THE INVENTION

Glass-ceramic articles have been marketed commercially for over 30 years. The initial disclosure of such articles is found in U.S. Pat. No. 2,920,961 (Stookey) wherein it discloses the preparation of glass-ceramic articles through the heat treatment of precursor glass bodies. As explained therein, such articles are prepared in three general steps: (1) a glass forming batch, customarily containing a nucleating agent, is melted; (2) that melt is simultaneously cooled to a temperature below the glass's transformation range and a glass article is shaped therefrom; and, (3) that glass article is heat treated at temperatures above the annealing point of the glass and, frequently, above the softening point of the glass for a sufficient length of time to cause the glass to crystallize in situ. The heat treatment can be scheduled in such a manner as to control the size and, in some instances, the identity of the crystals developed. Therefore, in sum, the crystallization present in a glass-ceramic article can be the result of both the base composition of the precursor glass and the heat treatment the glass body is subjected to.

Glass-ceramic articles containing a spinel-type crystal phase are well known in the art; the original disclosure occurring in U.S. Pat. No. 3,268,315 (Stookey). This patent discloses a method for forming a glass-ceramic material consisting essentially, expressed in terms of weight percent on the oxide basis, of 40–70% $SiO_2$, 14–34% $Al_2O_3$, 8–27% MgO, and 0.4–2.5% $Cr_2O_3$, with the total of these constituents constituting at least 95% by weight of the glass material, and subsequent glass-ceramic. The patent further discloses that the glass-ceramic exhibits a crystallization consisting essentially of at least one crystal phase selected from the group consisting of a magnesium metasilicate and a spinel.

U.S. Pat. No. 3,873,329 (Beall) relates to the production of hard, high modulus glass-ceramic articles having a composition consisting essentially, expressed in terms of weight percent on the oxide basis, of 44–58% $SiO_2$, 14–28% $Al_2O_3$, 0.5–3.5% $B_2O_3$, 10–16% MgO, 3–9% $TiO_2$ and 3–7% $ZrO_2$, wherein the $TiO_2+ZrO_2$ totals about between 8–13%. The patent discloses a crystal phase assemblage comprised predominately of alpha-quartz and sapphirine with, frequently, a spinel phase ($MgO \cdot A_2O_3$) included also. Additionally, minor amounts of such other crystals as rutile, cordierite, zircon, and tetragonal zirconia or zirconium titanate are also formed in the glass-ceramic articles. Furthermore, the patent describes the crystals as fine-grained, homogeneously dispersed, but randomly oriented, within a very minor amount of residual glass (normally less than about 25% by volume). The fine-grained crystals described therein are disclosed as essentially being smaller than 5 microns, with the vast bulk thereof being less than 1 micron in diameter.

U.S. Pat. No. 3,936,287 (Beall et al.), an improvement of the aforementioned Beall patent, describes a method for making a glass-ceramic article exhibiting a modulus of rupture in excess of about 150,000 psi and demonstrating frangibility when fractured, consisting essentially, by weight percent on the oxide basis, of about 48–51% $SiO_2$, 23–26% $Al_2O_3$, 1–3% $B_2O_3$, 13–15% MgO, 4–8% $TiO_2$ and 3–7% $ZrO_2$, wherein the $TiO_2+ZrO_2$ totals about between 9–13%. The method includes a step which consists of contacting the glass-ceramic article with a source of lithium ions in order to replace at least a pan of the magnesium ions to produce crystals of lithium stuffed beta-quartz in the surface layer of the glass-ceramic. The internal crystal phase assemblage of the glass ceramic mirrors that of the earlier described Beall patent.

Lastly, U.S. Pat. No. 3,681,102 (Beall) discloses the production of transparent glass-ceramic articles which possess a crystal content that is substantially free from silicate-containing phases and is at least 20, but less than 50%, by weight. The crystals are disclosed therein as consisting essentially of zinc spinel and as being substantially all finer than 1000Å in diameter. Additionally, the composition of the article is described as consisting essentially of 55–75% $SiO_2$, 8–25% $Al_2O_3$, 2–20% ZnO and 2–12% $ZrO_2$.

Other compositionally similar patents generally disclose the existence of a spinel-type crystal phase include U.S. Pat. Nos. 3,585,054 (Karstetter), 3,681,102 (Beall), 3,962,514 (Rittler), 4,059,454 (Reade), 4,867,750 (Pinckney), 5,028,567 (Gotoh et al.), 5,079194 (Jean et al.), and U.K. Pat. No. 1,544,779 (Macmillan et al.).

Although all of the aforementioned disclose the formation of glass-ceramic articles which contain spinel crystals, the instant invention can be differentiated from these references for a number of reasons because the exact compositional range, carefully delineated and disclosed herein, is not taught in any of the references; thus, the resulting phase assemblage and the corresponding physical properties are significantly different.

SUMMARY OF THE INVENTION

Accordingly, the present invention is directed toward the production of glass-ceramic articles exhibiting Young's modulus between about 15 to $24 \times 10^6$ psi and a fracture toughness in excess of 1.0 $MPa \cdot m^{1/2}$ The crystal phase assemblage is comprised predominately of generally uniformly-sized spinel-type crystals which are uniformly dispersed within a highly siliceous residual glass matrix phase. The composition of these glass-ceramic articles consists essentially, expressed in terms of weight percent on the oxide basis, of 35–60% $SiO_2$, 20–35% $Al_2O_3$, 0–25% MgO, 0–25% ZnO, at least about 10% MgO+ZnO, 0–20% $TiO_2$, 0–10% $ZrO_2$, 0–2 $Li_2O$ and 0–8% NiO. However, if the $Al_2O_3$ constituent is present in an amount less than about 25%, the $TiO_2+ZrO_2+NiO$ amount should be at least 5%. The composition may also include up to 5% of optional constituents selected from the group consisting of BaO, CaO, PbO, SrO, $P_2O_5$, $B_2O_3$, $Ga_2O_3$, 0–5% $R_2O$, and 0–8% of a transition metal oxide. The $R_2O$ amount is selected from the group consisting of $Na_2O$, $K_2O$, $Rb_2O$, and $Cs_2O$, while the transition metal oxide is selected from the group consisting of the oxides of Cu, Co, Fe, Mn, Cr, Sn and V with the oxides of Cr, Co, Mn, Cu, if present, not exceeding about 1% of the glass composition.

Preferably, the so-formed spinel crystals exhibit dimensions finer than about 1000Å in diameter. In addition, glass-ceramic articles may be produced in which the so-formed crystals exhibit a dimension of equal to or finer than about 300Å in diameter; specifically, those contemplated for use as rigid disk substrate for use in magnetic memory disk devices.

DETAILED DESCRIPTION OF THE INVENTION

As indicated above, glass-ceramics have been known in the art for at least thirty years. In general, glass-ceramics consist of randomly oriented crystals dispersed within a matrix of residual glass and can be produced through controlled internal nucleation and crystallization of a precursor glass body. Hence, a glass forming batch of the desired composition is melted and that melt is cooled and simultaneously formed into a glass shape of a predetermined configuration utilizing conventional glass forming techniques. Glass forming batches for the inventive low alkali spinel crystal-containing glass-ceramic precursor glasses are easily melted and the ensuing viscous melts can be shaped into articles of widely varying geometries. The composition of the precursor glass, and the subsequently formed glass-ceramic, consists essentially, expressed in terms of weight percent on the oxide basis, 35–60% $SiO_2$, 20–35% $Al_2O_3$, 0–25% MgO, 0–25% ZnO, at least about 10% MgO+ZnO, 0–20% $TiO_2$, 0–10% $ZrO_2$ 0–2% $Li_2O$ and 0–8% NiO. However, if the $Al_2O_3$ constituent is present in an amount less than about 25%, the $TiO_2+ZrO_2+NiO$ amount should be at least 5%. The composition may also include up to 5% of optional constituents selected from the group consisting of BaO, CaO, PbO, SrO, $P_2O_5$, $B_2O_3$, $Ga_2O_3$, 0–5% $R_2O$, and 0–8% of a transition metal oxide. The $R_2O$ amount is selected from the group consisting of $Na_2O$, $K_2O$, $Rb_2O$, $Cs_2O$ while, preferably, the transition metal oxide is selected from the group consisting of the oxides of Cu, Co, Fe, Mn, Cr, Sn and V; if the oxides of Cr, Co, Mn, Cu present they should not exceed about 1% of the glass composition.

Preferably, the composition of precursor glass, and ultimately the glass-ceramic, consists essentially, expressed in terms of weight percent on the oxide basis, of about 40–50% $SiO_2$, 22–30% $Al_2O_3$, 7–18% MgO, 0–12% ZnO, 7–13% $TiO_2$, at least about 13% MgO+ZnO, 0–4% $ZrO_2$, 0–5% NiO, and at least about 8% $TiO_2+ZrO_2$.

Once the glass shape was formed, it was heat treated in accordance with a predesigned schedule to induce nucleation and the growth of crystals on the nuclei; and thereafter, where necessary, the crystallized article was finished to precise dimensions and desired surface texture. Specifically, the glass article was heated to a temperature range of about 750°–850° C. at a temperature rate of approximately 300° C./hour and thereafter maintained at the temperature for a time sufficient to cause the article to obtain a high degree of nucleation. Once nucleated, the glass article was then heated to a temperature range about 900°–1150° C. at a temperature rate of approximately 300° C./hour. The glass article was thereafter maintained at that temperature for a time sufficient to cause the article to crystallize in situ forming a crystallized glass article which exhibits a crystal phase assemblage comprised predominately of spinel crystals.

More specifically, the glass-ceramic articles formed will exhibit a crystal phase assemblage comprised predominately of uniformly-sized spinel crystals exhibiting ultra-fine grains. Predominately, as used herein, indicates that the spinel crystals are present in a greater amount than any of the other accessory crystal phases which may be exhibited by the inventive glass-ceramic. Preferably, the spinel crystals comprise about 25%, or greater, by weight of the glass-ceramic article. It is also preferred that the so-formed spinel crystals exhibit dimensions finer than about 1000Å in diameter, and more preferably equal to, or finer than about 300Å in diameter. Furthermore, the spinel crystals are uniformly distributed within a residual siliceous glass matrix phase.

Depending on the precursor glass chosen, the resultant spinel crystals which are present in the crystal phase assemblage may be entirely of the aluminate variety, as represented by $(Mg,Zn)Al_2O_4$, entirely of the titanate variety, as represented by $(Mg/Zn)_2TiO_4$ or a mixture of both, as their is only limited solid solution between the aluminate and titanate spinels.

It should be noted that the crystal phase assemblage may also include, in addition to the requisite predominate spinel crystals, those accessory phases selected from the group consisting of $MgTi_2O_5$, quartz solid solution, an (Mg,Zn) petalite-type phase, enstatite, sapphirine, mullite, rutile, cordierite, tetragonal zirconia and/or $ZrTiO_4$, transition metal spinels and mixtures thereof. Regardless of the crystal phase assemblage obtained in addition to the spinel crystals, these crystals, like the aforementioned spinel crystals are uniform in size, preferably exhibit a grain size diameter of less than about 1000Å, and are uniformly dispersed within the highly siliceous residual glass phase.

Both the MgO and ZnO constituents are key spinel crystal formers, therefore, it is imperative that either one or the other, or both, are present in the precursor glass, and ultimately the glass-ceramic. Inclusion of high amounts of MgO by weight, tends to yield glass-ceramics exhibiting a high moduli, i.e, a modulus equal to, or exceeding $17 \times 10^6$ psi. Specifically, the highest modulus glass-ceramics are obtained with a higher MgO/ZnO ratio, although respectably high modulus values can be achieved with Zn-rich values. On the other hand, the inclusion of high amounts of ZnO, 5–10%, tends to minimize the crystallization of other phases. For instance, the presence of high amounts of ZnO can be particularly important if a single phase/spinel crystal-containing glass-ceramic is required. Otherwise, without the inclusion of ZnO, the Mg—Ti spinels are generally accompanied by phases such as $MgTi_2O_5$, quartz and/or (Mg,Zn) petalite-type phases, and sometimes cordierite.

Similar to the effect of ZnO, the inclusion of NiO, usually as a substitute for either MgO or ZnO, also aids in the minimizing the number of phases. Typically, the NiO combines with a portion of the $SiO_2$ to form $Ni_2SiO_4$ spinel (solid solution), while at the same time lowering the tendency toward quartz crystallization. In addition, the NiO also acts as a auxiliary nucleating agent.

Nucleation efficiency is enhanced by the presence of components such as $TiO_2$, $ZrO_2$ and NiO, and also high levels of the $Al_2O_3$. If the $Al_2O_3$ constituent is present in an amount is less than about 25%, it becomes necessary to include in the composition at least 5% by weight of either $TiO_2$, $ZrO_2$ or NiO. In addition to contributing efficient nucleation, the $TiO_2$ constituent also may enter the spinel phase itself. Also, amounts of $Cr_2O_3$ tip to its solubility limit of approximately 1%, may be added to further enhance the nucleation efficiency.

If a glass-ceramic exhibiting a higher spinel crystal content and increased elastic modulus is desired, the composition of the precursor glass, and the ultimate glass-ceramic, should be comprised of increased amounts of the spinel forming constituents MgO or ZnO and $Al_2O_3$. Specifically, increased amounts of the MgO, ZnO and $Al_2O_3$ coupled with lowered amounts of $SiO_2$ result in a glass-ceramic with a higher spinel content and an increased elastic modulus; however one skilled in the art should recognize that a decrease in the glass stability of the glass-ceramic precursor glass would be a likely tradeoff.

Silica typically does not enter the spinel phase, unless NiO is present in the glass, rather, the silica typically provides the matrix of residual glass which is uniformly distributed with the crystal phase assemblage. Additionally, the silica may combine with alumina and any excess MgO, ZnO and/or $Li_2O$ to form quartz solid solution, (Mg,Zn) petalite-type phases, enstatite or cordierite. These phases may be very fine grained themselves and, if so, they would likely provide extra strength and toughness to the materials over that obtained with spinel crystals and glass alone.

If the inventive glass-ceramic exhibits an accessory phase of quartz solid solution, it is typically present as a solid solution between $SiO_2$, $LiAlO_2$, $MgAl_2O_4$, and $ZnAl_2O_4$; however, the $SiO_2$ constituent is usually predominating.

The addition of small amounts of $Li_2O$ can induce quartz solid solution crystals, if desired in place of siliceous residual glass.

In other words, it should be fairly obvious that numerous compositions within the claimed inventive compositions may be used to produce different microstructures comprising a variety of crystal phase assemblages. However, it should be reiterated that the inventive glass-ceramics, regardless of accessory crystal phases exhibited, possess a number of common attributes: (1) the requisite spinel-type crystals in whatever form, titanate or aluminate, are present as the predominate crystal phase; (2) whatever crystal phase assemblage is obtained possesses spinel crystals which exhibit a fine crystal or grain size diameter which is preferably less than about 1000Å, and more preferably less than about 300 Å; and, (3) the crystals are uniformly distributed within a highly siliceous residual glass phase.

As a result of the so-formed uniform microstructures possessing ultra-fine crystal or grain sizes, extremely smooth polished surfaces may be produced from the inventive glass-ceramics without excessive polishing. Potentially, these nanocrystalline microstructure-containing glass-ceramics can exhibit polished surfaces possessing average roughness measurements on the order of about 5Å or less, as measured by atomic force microscopy (AFM) techniques. One potential application for these high modulus glass-ceramics exhibiting this type of possible surface roughness is as ultra-smooth, high-performance rigid disk substrates for use in magnetic memory storage devices.

In addition, it should be noted that the strength and toughness exhibited by these inventive nanocrystalline glass-ceramics exhibits are greater than those which might otherwise be expected from such ultra-fine microstructures. While not intending to be limited by theory, this unexpected strength and toughness in excess of 1.0 Mpa·m$^{1/2}$., is thought to be a result of a phenomenon known as dispersion strengthening. Spinel crystals have both a higher density and a higher thermal expansion than the surrounding residual glass. As a result, during the cooling of the glass-ceramic after heat-treatment, the glassy phase surrounding such crystals produces tangential compression around the crystal, while radial tension exists between the crystals. Thus, any fracture will be deflected around each crystal. The deflection path around each tiny crystal is not long, but there are millions of them, resulting in an extremely tortuous fracture causing high energy of fracture. This fracture toughness increases according to the relation $K_{ic}=(2E\gamma)^{1/2}$, where E is the Young's modulus and $\gamma$ the energy of fracture; both E and $\gamma$ are relatively high in these inventive glass-ceramics and thus provide an unexpectedly high fracture toughness.

EXAMPLES

Table I specifically records a number of precursor glass compositions, expressed in terms of weight percent on the oxide basis, which, when crystallized, illustrate the glass-ceramics operable in the present invention. The actual batch ingredients for the glasses can comprise any materials, either the oxides or other compounds, which, upon being melted together, are converted into the desired glass forming melt containing the proper oxide proportions, e.g., high purity sand is conveniently employed as the source of $SiO_2$.

The batch materials were thoroughly mixed together in order to secure a homogeneous melt, and subsequently placed into silica and/or platinum crucibles. The crucibles were placed into a furnace and the glass batch was then melted and maintained at temperatures ranging from 1500°–1650° C. for times ranging from about 6–16 hours. The melts were thereafter poured into steel molds to yield glass slabs having dimensions of approximately 4"×8"×½"(~20×107×1¼ cm). Subsequently, those slabs were transferred immediately to an annealer operating at about 650°–750° C. Samples were held at this temperature for about 1–3 hours and subsequently cooled overnight.

After the glass slabs were removed from the annealer, glass tabs of approximately 1"×2"×½"(2½×5×1¼ cm) were cut from the slabs. These glass tabs were then subjected to one of the heat treatments reported in Table III, i.e. the glass tabs were crystallized in situ to form glass-ceramic tabs. The tabs were then measured for the properties reported herein. Additionally, if so desired, these glass-ceramic tabs could be ground, lapped and polished using standard techniques in order to generate surface characteristics which would allow the surface and the microstructure to be studied using standard analytical techniques. Included among such analytical techniques are scanning electron microscopy (SEM), replica electron microscopy (REM), atomic force microscopy (AFM), etc., In addition, Table I reports the crystalline phases (Phases), as identified through X-ray diffraction, developed as a result of the heat treatment of the glass examples; the predominate phase present (pred) and the accessory phases (acces.). As can be determined from a review of the Table, all of the examples reported therein contain a crystal phase assemblage which is comprised predominately of the requisite spinel crystals (S). Additionally, the table reports that the other accessory phases which are present, including $MgTi_2O_5$ (M), quartz solid solution (Q), (Mg,Zn) petalite-type phase (P), enstatite (E) mullite (Mu), tetragonal zirconia (Z) and $ZrTiO_4$ (Zr).

Table II reports the heat treatment schedule the precursor glass examples were subjected to (H. T.), the visual description (Appear.), the elastic or Young's modulus (E), the bulk density (B. D.), the coefficient of thermal expansion (C.T.E.), the Knoop hardness (KHN), the fracture toughness (KIC) and the modulus of rupture of an abraded sample (MOR).

It will be recognized that, whereas the above description is drawn to laboratory practice, the glasses operable in the invention described herein can be melted in large scale/commercial melting tanks and formed into desired shapes using conventional glass melting techniques and forming processes. It is only necessary that the compositions be fired at sufficiently high temperatures and for a sufficient length of time to produce a homogeneous melt, and thereafter the melt is cooled and simultaneously shaped into a glass body which is customarily annealed.

Moreover, it should be recognized that various heat-treatment cycles and compositions may be used to produce different microstructures or crystal phase assemblages. However, as Table I reveals, all of the Examples produced contain the requisite spinel crystals in whatever form, titanate or aluminate, as one of the major crystal phases.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 41.9 | 40.4 | 44.7 | 44.2 | 46.9 | 46.9 | 46.9 | 45.0 | 43.0 | 40.2 | 44.8 | 43.7 | 43.7 |
| $Al_2O_3$ | 28.7 | 27.5 | 26.8 | 26.8 | 24.8 | 24.8 | 28.3 | 30.8 | 26.8 | 25.0 | 25.1 | 24.5 | 26.2 |
| $K_2O$ | 2.2 | 2.3 | — | — | — | — | — | — | 2.4 | 2.2 | 2.2 | 2.2 | 2.2 |
| ZnO | 22.5 | 13.8 | 10.7 | 4.4 | 3.5 | 1.8 | — | 24.2 | 23.0 | 21.4 | 12.6 | 12.2 | 10.5 |
| MgO | — | 11.4 | 8.9 | 12.5 | 13.3 | 15.0 | 13.3 | — | — | — | 9.0 | 8.7 | 8.7 |
| $TiO_2$ | 4.7 | 4.6 | 8.9 | 11.6 | 11.5 | 11.5 | 11.5 | — | — | — | 6.3 | 8.7 | 8.7 |
| $Ga_2O_3$ | — | — | — | — | — | — | — | — | 4.8 | 4.5 | — | — | — |
| $ZrO_2$ | — | — | — | — | — | — | — | — | — | 6.7 | — | — | — |
| Phases |  |  |  |  |  |  |  |  |  |  |  |  |  |
| pred. | S | S | S | S | S | S(2) | S | S | S | S | S | S | S |
| acces. | — | E | M,Q | M | M | M,Q,P | M,Q | Mu | — | Z | E | M | M,E |

|  | 14 | 15 | 16 | 17 | 18 | 19 | 20 | 21 | 22 | 23 | 24 |
|---|---|---|---|---|---|---|---|---|---|---|---|
| $SiO_2$ | 44.5 | 43.2 | 43.7 | 46.7 | 49.0 | 47.0 | 47.3 | 47.8 | 44.0 | 41.0 | 46.5 |
| $Al_2O_3$ | 26.7 | 26.0 | 27.9 | 23.0 | 24.0 | 26.5 | 28.6 | 30.6 | 27.0 | 27.5 | 24.6 |
| $K_2O$ | 2.2 | 2.2 | 2.2 | — | — | — | — | — | — | — | — |
| ZnO | 5.3 | 3.5 | 15.7 | 11.4 | 5.0 | 3.5 | 3.6 | 3.6 | 7.0 | 9.5 | 1.8 |
| MgO | 12.4 | 12.1 | 3.4 | 7.6 | 12.0 | 11.5 | 9.8 | 8.1 | 8.0 | 11.0 | 14.9 |
| $TiO_2$ | 8.9 | 13.0 | 7.0 | 6.6 | 10.0 | 11.5 | 10.7 | 9.9 | 9.0 | 6.0 | 9.6 |
| NiO | — | — | — | — | — | — | — | — | 5.0 | 5.0 | — |
| $ZrO_2$ | — | — | — | 3.3 | — | — | — | — | — | — | 2.6 |
| $B_2O_3$ | — | — | — | 1.4 | — | — | — | — | — | — | — |
| Phases |  |  |  |  |  |  |  |  |  |  |  |
| pred. | S | S(2) | S | S | S | S | S | S | S | S | S |
| acces. | M,E | M | — | P,E,Z | M | M,Q | Q,M | Q,M | — | E | Zr |

S—Spinel
S(2)—both an aluminate and a titanate spinel
Q—Quartz solid solution
M—$MgTi_2O_5$
E—Enstatite
P—(Mg,Zn) petalite-type phase
Mu—Mullite
Z—Tetragonal $ZrO_2$
Zr—$ZrTiO_4$

TABLE II

|  | 1 | 2 | 3 | 4 | 5 | 6 | 7 | 8 | 9 | 10 | 11 | 12 | 13 |
|---|---|---|---|---|---|---|---|---|---|---|---|---|---|
| H.T. | A | A | A | B | B | B | B | C | C | C | D | D | A |
| Appearance |  |  |  |  |  |  |  |  |  |  |  |  |  |
| color | na | wh | d pur | d gry | gry | gry | gry | wh | wh | wh | gry | d gry | d gry |
| fracture-type | gl | — | gl | ad | gl-ad | ad | ad | — | — | — | gl | — | w |
| $E(\times 10^{-6} psi)$ | 15.57 | 18.39 | 18.76 | 18.6 | 18.58 | 18.74 | 20.58 | — | 16.03 | 16.09 | 17.25 | 17.58 | 17.45 |
| $B.D.(g/cm^3)$ | 3.06 | 3.13 | 3.08 | 2.95 | 2.91 | 2.93 | 3.04 | — | 3.24 | 3.15 | 3.02 | 3.05 | 3.01 |
| C.T.E. ($\times 10^{-7}$/°C.) | 51 | 68 | 72 | 60 | — | 60 | — | — | 56 | 52 | — | — | — |
| $KHN(g/mm^2)$ | 651 | 776 | 740 | 730 | — | 760 | — | — | 657 | 680 | — | — | — |
| $KIC(MPa \cdot m^{1/2})$ | — | — | — | — | — | 1.3 | — | — | — | — | — | — | — |
| MOR(psi) | — | — | — | — | — | 14,000 | — | — | — | — | — | — | — |

|  | 14 | 15 | 16 | 17 | 18 | 19 | 20 | 21 | 22 | 23 | 24 |
|---|---|---|---|---|---|---|---|---|---|---|---|
| H.T. Description | A | A | A | E | E | F | F | F | G | G | B |
| color | d gry | d gry | na | l br | l br | gry | bl | d bl | d grn | grn | gry |
| fracture-type | wa | wa | gl | — | — | gl | gl | gl | grn | ad | ad |

TABLE II-continued

| | | | | | | | | gl | | |
|---|---|---|---|---|---|---|---|---|---|---|
| E(x10⁻⁶ psi) | — | — | 15.9 | 17.23 | 16.89 | 17.42 | 17.36 | 16.48 | 17.8 | 20.0 | 18.5 |
| B.D.(g/cm³) | — | — | — | 3.05 | 2.87 | 2.87 | 2.87 | 2.83 | 2.99 | 3.16 | 2.95 |

Colors
na—navy
d grn—dark green
gn—green
d. gry—dark grey
gry—grey
lt br—light brown
d bl—dark blue
bl—blue
wh—white
d pur—dark purple
Fracture-type
gl—glassy
wa—waxy
ad—adamantine

TABLE III

| Designation | Heat Treatment Schedule |
|---|---|
| A | R.T. to 800° C. at 300° C./hour<br>Hold at 800° C. for 2 hours<br>Raise to 1000° C. at 300° C./hour<br>Hold at 1000° C. for 4 hours<br>Cool to R.T. at furnace rate |
| B | R.T. to 800° C. at 300° C./hour<br>Hold at 800° C. for 2 hours<br>Raise to 975° C. at 300° C./hour<br>Hold at 975° C. for 4 hours<br>Cool to R.T. at furnace rate |
| C | R.T. to 800° C. at 300° C./hour<br>Hold at 800° C. for 2 hours<br>Raise to 950° C. at 300° C/hour<br>Hold at 950° C. for 1 hour<br>Cool to R.T. at furnace rate |
| D | R.T. to 850° C. at 300° C./hour<br>Hold at 850° C. for 2 hours<br>Raise to 1000° C. at 300° C./hour<br>Hold at 1000° C. for 4 hours<br>Cool to R.T. at furnace rate |
| E | R.T. to 810° C. at 300° C./hour<br>Hold at 810° C. for 4 hours<br>Raise to 965° C. at 300° C./hour<br>Hold at 965° C. for 4 hours<br>Cool to R.T. at furnace rate |
| F | R.T. to 800° C. at 300° C./hour<br>Hold at 800° C. for 2 hours<br>Raise to 950° C. at 300° C./hour<br>Hold at 950° C. for 4 hours<br>Cool to R.T. at furnace rate |
| G | R.T. to 800° C. at 300° C./hour<br>Hold at 800° C. for 1 hours<br>Raise to 1000° C. at 300° C./hour<br>Hold at 1000° C. for 2 hours<br>Cool to R.T. at furnace rate |

Figure 1:
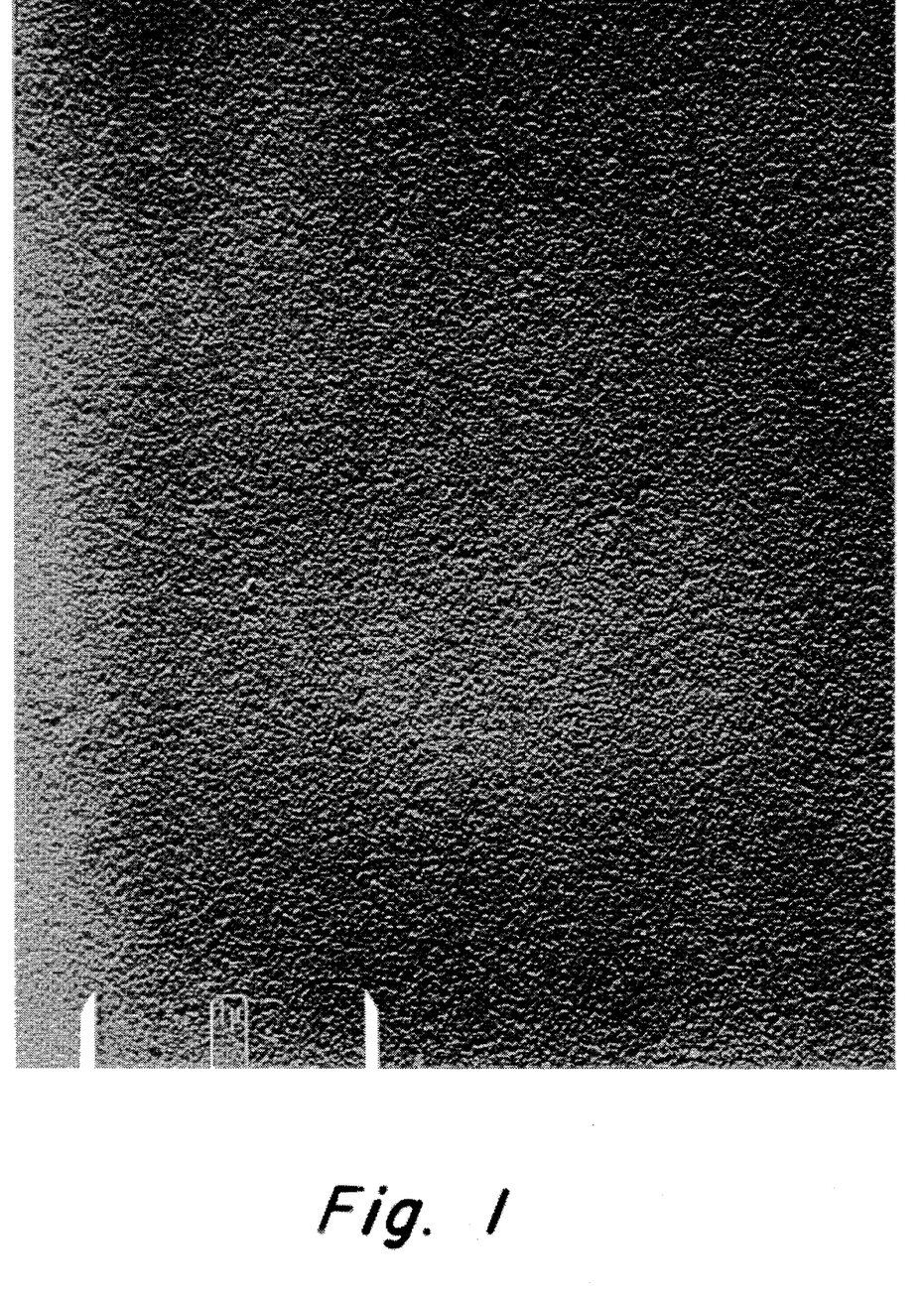
FIG. 1 is replica electron micrograph (REM) illustrating the highly uniform, very fine grained microstructure, comprising spinel crystals exhibited by the inventive glass-ceramic designated as Example 20.

FIG. 1 is a replica electron micrograph, taken at magnification of 50,000×, of a polished section of the inventive glass-ceramic article reported above as Example 20. The bar at the bottom of the micrograph represents 1 micron. In order to enhance the contrast between the crystals and the residual glass, the sample, which appears in the micrograph, was sufficiently polished using standard techniques and acid etched. Specifically, the sample was acid-etched for 1 minute using an etchant solution comprised of a combination of ½% HF and 1¼% HCl. As a result of this acid etching, the so-formed crystals, a mixture of titanate spinel, aluminate spinel, Mg-dititanate ($MgTi_2O$), β-quartz and a (Mg,Zn) petalite-type phase in the instant example, are not as readily dissolved by the acid as the residual glass, and thus protrude above the matrix glass. As can be easily observed in the micrograph, the crystals are generally uniform in size and exhibit grain sizes of less than 100Å. In addition, it is also apparent from the micrographs, that the crystals which make up the crystal phase assemblage are uniformly dispersed within the residual glass. However, as earlier indicated, other compositions within this claimed scope may result in different crystal phase assemblage combinations and thus potentially different surface textures than that which appears in this micrograph.

Figure 2:
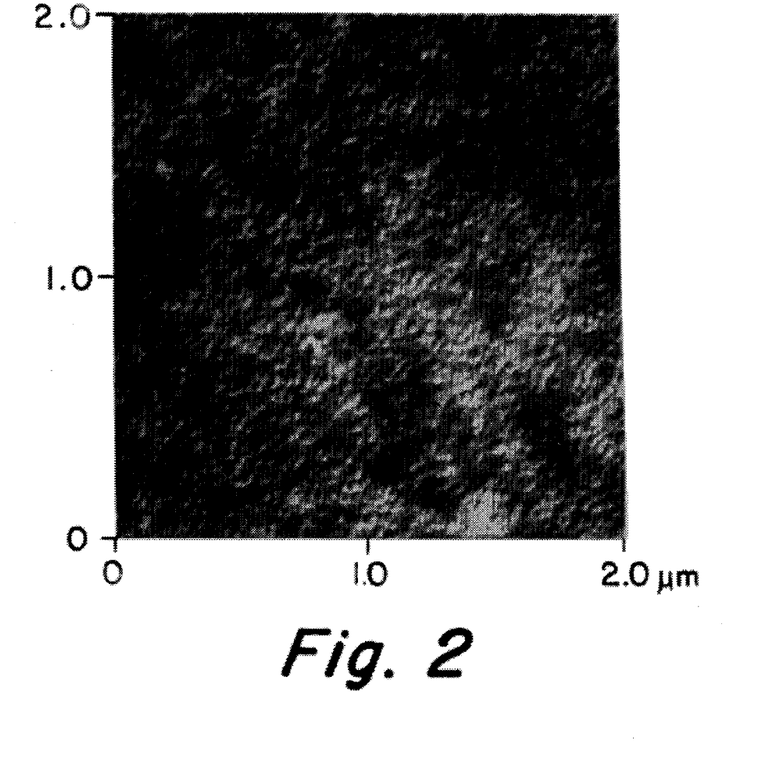
FIG. 2 is an atomic force micrograph (AFM) illustrating the surface smoothness exhibited by the highly uniform, very fine grained spinel crystal-containing microstructure of the Example 6 glass-ceramic.

FIG. 2 is an atomic force micrograph illustrating the surface roughness/crystal phase microstructure of the Example 6 glass-ceramic. The sample was sufficiently polished utilized standard techniques in order to generate a sample for measuring the surface texture. The scale of the micrograph is 2×2 μm. The image statistics/roughness analysis results revealed by this micrograph are a $R_a$ of 5.3 Å, i.e, an extremely smooth polished surface. Examination of the micrograph supports the earlier observation that the crystals which make up the crystal phase assemblage for this particular example are uniformly dispersed within the glass matrix and exhibit ultra fine grain sizes of less than about 100Å. It should be noted that, as opposed to the REM micrograph above, the crystals are represented by the indentions in this AFM.

Figure 3:
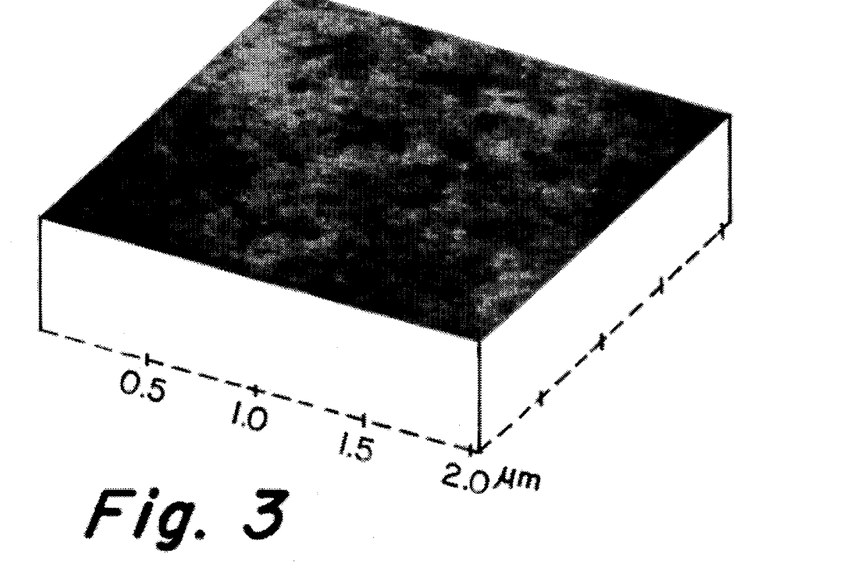
FIG. 3 is an atomic force micrograph, 3-D view of FIG. 2., again illustrating the surface smoothness exhibited by e microstructure of the Example 6 glass-ceramic.

FIG. 3 is an atomic force micrograph, 3-D view of FIG. 2, illustrating the surface roughness/crystal phase microstructure of the inventive glass-ceramic. Again the sample was sufficiently polished to generate a sample for measuring the surface texture. The X and Y dimensions of this micrograph are 2 μm and 2 μm, respectively. Once again, as can be observed from this micrograph, the resulting surface, following polishing, is quite uniformly textured and extremely smooth. As was earlier indicated, this is a result of the uniform distribution of the spinel crystals and accessory crystals within the residual siliceous glass phase. Additionally, the examination reveals that the surface texture (roughness) corresponds with the internal microstructure, with the spinel crystals and accessory crystals protruding above the mean surface topology. i.e., the harder spinel crystals and accessory crystals protrude above the residual glass following polishing, thus resulting in a uniformly textured surface.

Figure 4:
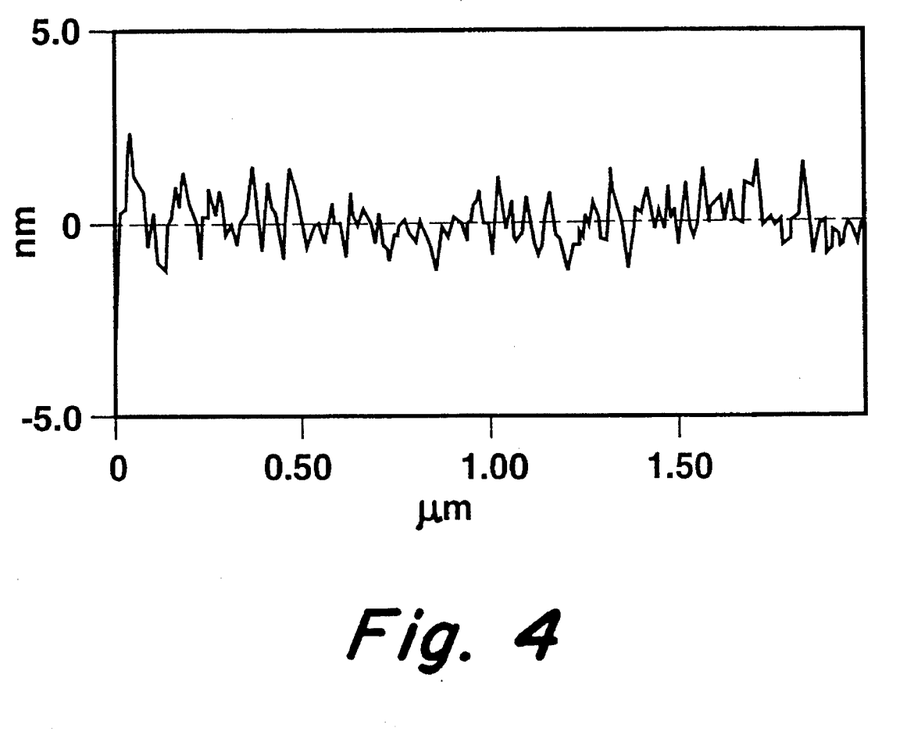
FIG. 4 is a graph of the cross-sectional profile of the FIG. 2 AFM, illustrating the smoothness of the surface and the uniformity of the microstructure of the inventive glass-ceramic designated as Example 6.

FIG. 4 is a graph illustrating the cross-sectional profile, taken along line A—A of FIG. 3, illustrating the surface roughness of the inventive glass-ceramic designated as Example 5. This figure lends support to the observation revealed in FIG. 3 that the surface which forms as a result of polishing, is uniformly textured and extremely smooth.

The harder crystals which are uniformly distributed throughout the surface and protrude above the residual siliceous glass matrix are represented by the peaks in the profile which rise above the 0 nm mark.

It should be noted that, the properties which the inventive glass ceramic material disclosed herein possess render it eminently suitable for use in a magnetic memory storage device comprised of a head pad and rigid information disk. Specifically, for use in the rigid information disk as the rigid disc substrate which possesses a layer of magnetic media on the its surface. In other words, the substrate would be comprised of the inventive glass-ceramic material exhibiting the crystal phase assemblage comprised predominately of spinel crystals.

Based on its overall combination of properties, i.e., an elastic modulus of $18.74 \times 10$–6 psi, a fracture toughness of 1.3 MPa·m$^{1/2}$ and a Knoop Hardness number of 760 KHN/100 and a MOR(abraded) of 14,000 psi, example 6 is deemed to be the most preferred composition.

We claim:

1. A glass-ceramic article exhibiting Young's modulus between about 14 to $24 \times 10^6$ psi and a fracture toughness in excess of 1.0 MPa·m$^{1/2}$, wherein the crystal phase assemblage is comprised predominately of generally uniformly-sized spinel crystals which are uniformly dispersed within a highly siliceous residual glass matrix phase, the article having an overall composition consisting essentially, expressed in terms of weight percent on the oxide basis, of 35–60% $SiO_2$, 20–35% $Al_2O_3$, 7–25% MgO, 0–25% ZnO, at least about 10% MgO+ZnO, 0–20% $TiO_2$, 0–10% $ZrO_2$, 0–2% $Li_2O$, 0–8% NiO, with the proviso that, if the $Al_2O_3$ amount is less than about 25%, the $TiO_2$+$ZrO_2$+NiO amount is at least 5%, and up to 5% of optional constituents selected from the group consisting of BaO, CaO, PbO, SrO, $P_2O_5$, $B_2O_3$, $Ga_2O_3$, 0–5% $R_2O$, wherein $R_2O$ is selected from the group consisting of $Na_2O$, $K_2O$, $Rb_2O$, and $Cs_2O$ and 0–8% of a transition metal oxide.

2. The glass-ceramic according to claim 1 wherein the transition metal oxide is selected from the group consisting of the oxides of Cu, Co, Fe, Mn, Cr, Sn and V, the oxides of Cu, Co, Mn and Cr not exceeding about 1%.

3. A glass-ceramic article according to claim 1 wherein the spinel crystals exhibit dimensions finer than about 1000Å in diameter.

4. A glass-ceramic article according to claim 1 wherein the spinel crystals exhibit dimensions finer than about 300Å in diameter.

5. A glass-ceramic article according to claim 1 wherein the crystal phase assemblage contains an accessory crystal phase selected from the group consisting of $MgTi_2O_5$, quartz solid solution, (Mg,Zn) petalite phases, enstatite, sapphirine, mullite, rutile, cordierite, tetragonal zirconia, $ZrTiO_4$, transition metal spinels and mixtures thereof.

6. A glass-ceramic article according to claim 1 wherein the spinel crystals are entirely of the aluminate variety, entirely of the titanate variety or a mixture of both titanates and aluminates the aluminate spinels consisting of either $MgAl_2O_4$, $ZnAl_2O_4$, or a solid solution represented by $(Mg,Zn)Al_2O_4$, the titanate spinels consisting of either $Mg_2TiO_4$, $Zn_2TiO_4$ or a solid solution represented by $(Mg,Zn)_2TiO_4$.

7. A glass-ceramic article according to claim 1 wherein the composition consists essentially, expressed in terms of weight percent on the oxide basis, of 40–50% $SiO_2$, 22–30% $Al_2O_3$, 7–18% MgO, 0–12% ZnO, 7–13% $TiO_2$, at least about 13% MgO+ZnO, 0–4% $ZrO_2$, 0–5% NiO, and at least about 8% $TiO_2$+$ZrO_2$.

8. A method for making a glass-ceramic article which comprises the steps of
   a. melting a batch for a glass composition consisting essentially, expressed in terms of weight percent on the oxide basis, of 35–60% $SiO_2$, 20–35% $Al_2O_3$, 7–25% MgO, 0–25% ZnO, at least about 10% MgO+ZnO, 0–20% $TiO_2$, 0–10% $ZrO_2$, 0–2% $Li_2O$, 0–8% NiO, with the proviso that, if the $Al_2O_3$ amount is less than about 25%, the $TiO_2$+$ZrO_2$+NiO amount is at least 5%, and up to 5% of optional constituents selected from the group consisting of BaO, CaO, PbO, SrO, $P_2O_5$, $B_2O_3$, $Ga_2O_3$, 0–5% $R_2O$, wherein $R_2O$ is selected from the group consisting of $Na_2O$, $K_2O$, $Rb_2O$ and $Cs_2O$ and 0–8% of a transition metal oxide; and,
   b. heating the glass article to a temperature range of about 750°–850° C. at a temperature rate of approximately 300° C./hour; and,
   c. maintaining the temperature for a time sufficient to cause the article to obtain a high degree of nucleation; and,
   d. heating the glass article to a temperature range about 900°–1150° C. at a temperature rate of approximately 300° C./hour; and,
   e. maintaining the temperature for a time sufficient to cause the article to crystallize in situ forming a crystallized glass article which exhibits crystal phase assemblage comprised predominately of generally uniformly-sized spinel crystals which are uniformly dispersed within a highly siliceous residual glass matrix phase.

9. The method according to claim 8 wherein the transition metal oxide is selected from the group consisting of the oxides of Cu, Co, Fe, Mn, Cr, and V, the oxides of Cu, Co, Mn, Sn and Cr not exceeding about 1%.

10. The method according to claim 8 wherein the spinel crystals exhibit dimensions finer than about 1000Å in diameter.

11. The method according to claim 8 wherein the spinel crystals exhibit dimensions finer than about 300Å in diameter.

12. The method according to claim 8 wherein the period of time sufficient to cause the article to obtain a high degree of nucleation is at least 1 hour and the period of time sufficient to cause the article crystallize in situ ranges between about 1–4 hours.

13. The method according to claim 8 wherein the crystal phase assemblage contains an additional accessory crystal phase selected from the group consisting of $MgTi_2O_5$, quartz solid solution, (Mg,Zn) petalite phases, enstatite, sapphirine, mullite, rutile, cordierite, tetragonal zirconia, $ZrTiO_4$, transition metal spinels and mixtures thereof.

14. The method according to claim 8 wherein the spinel crystals are entirely of the aluminate variety, entirely of the titanate variety or a mixture of both titanates and aluminates, the aluminate spinels consisting of either $MgAl_2O_4$, $ZnAl_2O_4$, or a solid solution represented by $(Mg,Zn)Al_2O_4$, the titanate spinels consisting of either $Mg_2TiO_4$, $Zn_2TiO_4$ or a solid solution represented by $(Mg,Zn)_2TiO_4$.

15. The method according to claim 9 wherein the composition consists essentially, expressed in terms of weight percent on the oxide basis, of 40–50% $SiO_2$, 22–30% $Al_2O_3$, 7–18% MgO, 0–12% ZnO, 7–13% $TiO_2$, at least about 13% MgO+ZnO, 0–4% $ZrO_2$, 0–5% NiO, and at least about 8% $TiO_2$+$ZrO_2$.

16. A magnetic memory storage device comprised of a head pad and rigid information disk, the disk comprising a rigid disc substrate having a layer of magnetic media on the surface thereof, wherein the substrate is comprised of a glass-ceramic exhibiting Young's modulus between about 14 to 24–10$^6$ psi and a fracture toughness in excess of 1.0 MPa·m$^{1/2}$, wherein the crystal phase assemblage is comprised predominately of generally uniformly-sized spinel crystals which are uniformly dispersed within a highly siliceous residual glass matrix phase, the article having an overall composition consisting essentially, expressed in terms of weight percent on the oxide basis, of 35–60% SiO$_2$, 20–35% Al$_2$O$_3$, 0–25% MgO, 0–25% ZnO, at least about 10% MgO+ZnO, 0–20% TiO$_2$, 0–10% ZrO$_2$, 0–2% Li$_2$O, 0–8% NiO, with the proviso that, if the Al$_2$O$_3$ amount is less than about 25%, the TiO$_2$+ZrO$_2$+NiO amount is at least 5%, and up to 5% of optional constituents selected from the group consisting of BaO, CaO, PbO, SrO, P$_2$O$_5$, B$_2$O$_3$, Ga$_2$O$_3$, 0–5% R$_2$O, wherein R$_2$O is selected from the group consisting of Na$_2$O, K$_2$O, Rb$_2$O, and Cs$_2$O and 0–8% of a transition metal oxide.

17. A magnetic memory storage device according to claim 16 wherein the transition metal oxide is selected from the group consisting of the oxides of Cu, Co, Fe, Mn, Cr, Sn, and V, the oxides of Cu, Co, Mn and Cr not exceeding about 1%.

18. A magnetic memory storage device according to claim 16 wherein the spinel crystals exhibit dimensions finer than about 1000Å in diameter.

19. A magnetic memory storage device according to claim 16 wherein the spinel crystals exhibit dimensions finer than about 300Å in diameter.

20. A magnetic memory storage device according to claim 16 wherein the crystal phase assemblage contains an additional accessory crystal phase selected from the group consisting of MgTi$_2$O$_5$, quartz solid solution, (Mg,Zn) petalite phases, enstatite, sapphirine, mullite, futile, cordierite, tetragonal zirconia, ZrTiO$_4$, transition metal spinels and mixtures thereof.

21. A magnetic memory storage device according to claim 16 wherein the spinel crystals are entirely of the aluminate variety, entirely of the titanate variety or a mixture of both titanates and aluminates the aluminate spinels consisting of either MgAl$_2$O$_4$, ZnAl$_2$O$_4$, or a solid solution represented by (Mg,Zn)Al$_2$O$_4$, the titanate spinels consisting of either Mg$_2$TiO$_4$, Zn$_2$TiO$_4$ or a solid solution represented by (Mg,Zn)$_2$TiO$_4$.

22. A magnetic memory storage device according to claim 16 wherein the composition consists essentially, expressed in terms of weight percent on the oxide basis, of 40–50% SiO$_2$, 22–30% Al$_2$O$_3$, 7–18% MgO, 0–12% ZnO, 7–13% TiO$_2$, at least about 13% MgO+ZnO, 0–4% ZrO$_2$, 0–5% NiO, and at least about 8% TiO$_2$+ZrO$_2$.

23. A rigid information disk for use in a magnetic memory storage device consisting essentially of a substrate with a coating of magnetic media on a surface thereof, wherein the substrate is comprised of a glass-ceramic material exhibiting Young's modulus between about 14 to 24×10$^6$ psi and a fracture toughness in excess of 1.0 MPa·m$^{1/2}$, wherein the crystal phase assemblage is comprised predominately of generally uniformly-sized spinel crystals which are uniformly dispersed within a highly siliceous residual glass matrix phase, the article having an overall composition consisting essentially, expressed in terms of weight percent on the oxide basis, of 35–60% SiO$_2$, 20–35% Al$_2$O$_3$, 0–25% MgO, 0–25% ZnO, at least about 10% MgO+ZnO, 0–20% TiO$_2$, 0–10% ZrO$_2$, 0–2% Li$_2$O, 0–8% NiO, with the proviso that, if the Al$_2$O$_3$ amount is less than about 25%, the TiO$_2$+ZrO$_2$+NiO amount is at least 5%, and up to 5% of optional constituents selected from the group consisting of BaO, CaO, PbO, SrO, P$_2$O$_5$, B$_2$O$_3$, Ga$_2$O$_3$, 0–5% R$_2$O, wherein R$_2$O is selected from the group consisting of Na$_2$O, K$_2$O, Rb$_2$O, and Cs$_2$O and 0–8% of a transition metal oxide.

24. A rigid information disk according to claim 23 wherein the transition metal oxide is selected from the group consisting of the oxides of Cu, Co, Fe, Mn, Cr, SnO and V, the oxides of Cu, Co, Mn and Cr not exceeding about 1%.

25. A rigid information disk according to claim 23 wherein the spinel crystals exhibit dimensions finer than about 1000Å in diameter.

26. A rigid information disk according to claim 23 wherein the spinel crystals exhibit dimensions finer than about 300Å in diameter.

27. A rigid information disk according to claim 23 wherein the crystal phase assemblage contains an additional accessory crystal phase selected from the group consisting of MgTi$_2$O$_5$, quartz solid solution, (Mg,Zn) petalite phases, enstatite, sapphirine, mullite, futile, cordierite, tetragonal zirconia, ZrTiO$_4$, transition metal spinels and mixtures thereof.

28. A rigid information disk according to claim 23 wherein the spinel crystals are entirely of the aluminate variety, entirely of the titanate variety or a mixture of both titanates and aluminates the aluminate spinels consisting of either MgAl$_2$O$_4$, ZnAl$_2$O$_4$, or a solid solution represented by (Mg,Zn)Al$_2$O$_4$, the titanate spinels consisting of either Mg$_2$TiO$_4$, Zn$_2$TiO$_4$ or a solid solution represented by (Mg,Zn)$_2$TiO$_4$.

29. A rigid information disk according to claim 23 wherein the composition consists essentially, expressed in terms of weight percent on the oxide basis, of 40–50% SiO$_2$, 22–30% Al$_2$O$_3$, 7–18% MgO, 0–12% ZnO, 7–13% TiO$_2$, at least about 13% MgO+ZnO, 0–4% ZrO$_2$, 0–5% NiO, and at least about 8% TiO$_2$+ZrO$_2$.

\* \* \* \* \*

UNITED STATES PATENT AND TRADEMARK OFFICE
CERTIFICATE OF CORRECTION

PATENT NO. : 5,476,821

DATED : Dec. 19, 1995

INVENTOR(S) : George H. Beall & Linda R. Pinckney

It is certified that error appears in the above-identified patent and that said Letters Patent is hereby corrected as shown below:

Item [57]
IN THE ABSTRACT:

In the Abstract, last line, "$C_2O$" should read --$Cs_2O$--.

Column 1, line 48, "14-28%" should read --20-28%--.

Column 2, line 5, "pan" should read --part--.

Column 4, line 65, "tip" should read --up--.

Column 9, line 62, "1-1/4%" should read --1 1/8%--.

IN THE CLAIMS:

Claim 16, column 13, line 3, "$24-10^6$" should read --$24 \times 10^6$--.

UNITED STATES PATENT AND TRADEMARK OFFICE
CERTIFICATE OF CORRECTION

PATENT NO. : 5,476,821
DATED : Dec. 19, 1995
INVENTOR(S) : George H. Beall, et al It is certified that error appears in the above-indentified patent and that said Letters Patent is hereby corrected as shown below:

```
Claim 27, column 14, line 35,
"futile" should read --rutile--.
```

Signed and Sealed this

Twenty-sixth Day of March, 1996

Attest:

BRUCE LEHMAN

Attesting Officer     Commissioner of Patents and Trademarks